United States Patent
Roth

(10) Patent No.: US 9,623,395 B2
(45) Date of Patent: Apr. 18, 2017

(54) DEVICE AND METHOD FOR REAL-TIME DETECTION OF MOLECULAR ACCUMULATIONS AND/OR MONITORING THE PRODUCTION PROCESS OF A MOLECULAR MICROARRAY

(71) Applicant: ALBERT-LUDWIGS-UNIVERSITAET FREIBURG, Freiburg (DE)

(72) Inventor: Guenter Roth, Freiburg (DE)

(73) Assignee: ALBERT-LUDWIGS-UNIVERSITAET FREIBURG, Freiburg (DE)

( * ) Notice: Subject to any disclaimer, the term of this patent is extended or adjusted under 35 U.S.C. 154(b) by 0 days.

(21) Appl. No.: 14/402,693

(22) PCT Filed: May 23, 2013

(86) PCT No.: PCT/EP2013/060660
§ 371 (c)(1),
(2) Date: Nov. 21, 2014

(87) PCT Pub. No.: WO2013/174942
PCT Pub. Date: Nov. 28, 2013

(65) Prior Publication Data
US 2015/0209752 A1    Jul. 30, 2015

(30) Foreign Application Priority Data

May 23, 2012 (DE) .................. 10 2012 104 453
Feb. 11, 2013 (EP) .................... 13154822

(51) Int. Cl.
*B01J 19/00* (2006.01)
*C40B 20/02* (2006.01)

(52) U.S. Cl.
CPC .. *B01J 19/0046* (2013.01); *B01J 2219/00527* (2013.01); *B01J 2219/00529* (2013.01);
(Continued)

(58) Field of Classification Search
CPC .......... B01J 19/0046; B01J 2219/00608; B01J 2219/00529; B01J 2219/00576;
(Continued)

(56) References Cited

U.S. PATENT DOCUMENTS

2003/0232382 A1* 12/2003 Brennan ................ C12Q 1/686
435/6.18
2009/0312188 A1   12/2009 Duer et al.

FOREIGN PATENT DOCUMENTS

CA    2565679 A1    11/2005
WO    2004/027093 A1    4/2004
(Continued)

OTHER PUBLICATIONS

Hiep et al. (Analytica Chimica Acta, 2010, vol. 661, pp. 111-116).*
(Continued)

*Primary Examiner* — Jeremy C Flinders
(74) *Attorney, Agent, or Firm* — Joyce von Natzmer; Agris & von Natzmer LLP

(57) ABSTRACT

The invention relates to a method for producing a microarray, wherein the production of this array is detected in real time from the accumulation of the product molecules being produced. The invention further relates to a microarray produced by this method, and to a device for the real-time detection of molecular accumulations on an array surface during the production of microarrays.

15 Claims, 16 Drawing Sheets

(52) U.S. Cl.
CPC ............ *B01J 2219/00533* (2013.01); *B01J 2219/00576* (2013.01); *B01J 2219/00585* (2013.01); *B01J 2219/00596* (2013.01); *B01J 2219/00605* (2013.01); *B01J 2219/00608* (2013.01); *B01J 2219/00626* (2013.01); *B01J 2219/00653* (2013.01); *B01J 2219/00659* (2013.01); *B01J 2219/00693* (2013.01); *B01J 2219/00704* (2013.01); *B01J 2219/00722* (2013.01); *B01J 2219/00725* (2013.01)

(58) Field of Classification Search
CPC .... B01J 2219/00585; B01J 2219/00596; B01J 2219/00605; B01J 2219/00626; B01J 2219/00527; B01J 2219/00659; B01J 2219/00693; B01J 2219/00704; B01J 2219/00722; B01J 2219/00725; B01J 2219/00533; B01J 2219/00653
See application file for complete search history.

(56) References Cited

FOREIGN PATENT DOCUMENTS

| WO | 2005/108604 A2 | 11/2005 |
| WO | 2009/039208 A1 | 3/2009 |
| WO | 2012/030961 A2 | 3/2012 |
| WO | 2012/104399 A2 | 8/2012 |

OTHER PUBLICATIONS

Harini Chandra et al: "Cell-free synthesis-based protein microarrays and their applications", in: Proteomics, vol. 10, No. 4, Feb. 1, 2010, pp. 717-730.

Jonathan M. Rothberg et al: "An integrated semiconductor device enabling non-optical genome sequencing", in: Nature, vol. 475, No. 7356, Jan. 1, 2011, pp. 348-352.

Rositsa Karamanska et al: "Surface plasmon resonance imaging for real-time, label-free analysis of protein interactions with carbohydrate mi croarrays", in: Glycoconjugate Journal, Kluwer Academic Publishers, BO, vol. 25, No. 1, Jun. 16, 2007, pp. 69-74.

\* cited by examiner

Signal generation of BIND*

3 glass     4 highly refractive layer, e.g. TiO2
5 binder     6 copied molecule     7 surface coating 3 glass
5 binder
8 gold layer for generation of SPR
6 copied molecule

Signal generation of ellipsometry*

3 glass   8 gold layer for generation of SPR
5 binder   6 copied molecule

Signal generation of turbidity/backscattering*

6 copied molecule    9 nucleic acid    10 copier enzyme
11 light scattering and/or absorbing molecule/complex 6 copied molecule
12 generated ions 9 nucleic acid    10 copier enzyme
13 detection electronics    14 interaction

Electronic signal generation on the surface*

6 copied molecule    9 nucleic acid    10 copier enzyme
13 detection electronics    14 interaction

Signal generation of fluorescence in solution*

6 copied molecule   9 nucleic acid   10 copier enzyme
23 byproduct of copier reaction   24 non-fluorescent substrate
25 enzyme   26 fluorescent product 3 glass   6 copied molecule   9 nucleic acid   10 copier enzyme
27 laser beam   24 Raman radiation

DEVICE AND METHOD FOR REAL-TIME DETECTION OF MOLECULAR ACCUMULATIONS AND/OR MONITORING THE PRODUCTION PROCESS OF A MOLECULAR MICROARRAY

CROSS-REFERENCE TO RELATED APPLICATIONS

This is the U.S. national stage of International application PCT/EP2013/060660, filed May 23, 2013 designating the United States and claiming priority to German application no. 10 2012 104 453.8, filed May 23, 2012 and European application no. 13154822.4, filed Feb. 11, 2013.

The invention relates to a method for producing a microarray, wherein the production of this array is detected in real time from the accumulation of the product molecules being produced. The invention further relates to a microarray produced by this method, and to a device for the real-time detection of molecular accumulations on an array surface during the production of microarrays.

PRIOR ART

The basic concept of "microarray copying" is still fairly new and has been embraced by only a small number of research groups and companies thus far. As a result, there have been few steps toward optimizing this copying process. One optimization involves manipulation by means of microfluidics (PCT/EP2012/051816, Device and method for generation of molecular microarrays). However, if "copying" is considered as analogous to photocopying, then only manipulation issues have been addressed, and not the "quality control of the copy" itself. With photocopiers, the age of the copier, the daily output of the apparatus and the properties of the inks and papers used are taken into consideration through real-time contrast monitoring in order to produce a copy of consistently high quality. This "contrast monitoring" is also necessary when copying a microarray, since particularly the reaction mixtures that are used, e.g. enzyme mixtures, and the template molecules, e.g. DNA array templates, are subject to severe fluctuations in quality and will produce corresponding copies or derivatives at a greater or lesser rate, depending on daily output. All previous publications have performed only one end point measurement. In this measurement, dye is applied to the molecules that are produced only after the copy has been generated, and the production of the copy is detected on the basis of this dye application. The copy is therefore virtually unusable for additional measurements, and there is no way to determine production of the copy how far the copy has progressed and whether the copying process should be lengthened, shortened or kept the same.

In classic methods, protein microarrays are produced by producing the proteins in cells, purifying each individual protein, and transferring these to the microarray. This transfer step is ensured by means of a "printer system". These techniques have already been in use for decades. Due to the complex method of producing proteins by purifying cell cultures, the corresponding protein microarrays cost around 1,000 € per array. And chemical synthesis of the proteins is out of the question due to the inadequate purity levels obtained through chemical synthesis. Short protein fragments, so-called peptides, are synthetically obtainable and allow the production of peptide microarrays. However, the biochemical usefulness of peptide microarrays is much lower than that of protein microarrays.

In more recent approaches, protein microarrays are produced from DNA microarrays, which are very much simpler to produce. A review that appeared in February 2010 (Chandra, Srivastava, "Cell-free synthesis-based protein microarray and their applications", Proteomics, vol. 10, pp. 717-730, 2010) describes the individual variants and options achieved thus far for producing a protein microarray from a DNA microarray. In order for protein to be produced from DNA, the DNA must have certain recognition sequences, in order to be "expression ready".

In 2001, He and Taussig published the PISA system (He, Taussig, "Single step generation of protein arrays from DNA by cell-free expression and in situ immobilization (PISA method)", Nucleic Acids Research, vol. 29, no. 15, p. art-e73, August 2001). In this case, the DNA is mixed with the cell-free expression system immediately prior to use, and is then dispensed onto a surface. Protein is then produced in this small liquid drop. The protein contains a His-tag, which binds to the nickel-NTA surface. As soon as enough protein has bonded to the surface of the microarray, a washing step is carried out. The DNA and all proteins without a His-tag are washed away in this step. Only the "purified" His-tag protein remains on the surface. The microarray is then used directly for binding measurements. In 2006, a microarray having 13,000 proteins was published using this technique (Sobek et al, "Microarray technology as a universal tool for high-throughput analysis of biological systems", Combinatorial Chemistry & High Throughput Screening, vol. 9, no. 5, pp. 365-380, June 2006).

Although the cumbersome process of purifying individual proteins is avoided in this manner (as compared with the classic techniques), the effort involved in mixing the individual DNA sequences with the cell-free expression system immediately prior to transfer to the microarray is enormous, and should be carried out under identical parameters for concentration and time for each individual spot of the microarray. It is therefore particularly disadvantageous that parallel monitoring is not performed.

In 2004, LaBear published the NAPPA system (Ramachandran et al, "Self-assembling protein microarrays", Science, vol. 305, no. 5680, pp. 86-90, July 2004). In this case, first a surface which bears Streptavidin and an antibody against a protein sequence (in this case His-tag) is produced. Onto this surface, DNA was printed, which binds via a biotin to the Streptavidin. These DNA microarrays can be stored for 1 to 2 years. The shelf-life of the entire NAPPA microarray is limited only by the shelf life of the antibody. Immediately prior to use, the entire microarray is coated with a cell-free expression system. On each DNA spot, a different protein forms which diffuses freely into the space. Since the protein contains a sequence that binds to the antibody, it is statistically highly probable that the protein will bind on the spot or in immediate proximity thereto. After a washing step, the microarray can be used. Only the DNA and the protein that has formed remain on the surface. In 2008, a microarray having just over 1,000 proteins was produced in this manner (Ramachandran, Srivastava, LaBaer, "Applications of protein microarrays for biomarker discovery", Proteomics Clinical Applications, vol. 2, no. 10-11, pp. 1444-1459, October 2008).

The tremendous advantage of NAPPA as compared with PISA is that any number of DNA microarrays can be produced and stored. The protein is not produced until shortly before use. However, the dual binding system of Streptavidin and antibodies (cost factor) and the fact that the DNA remains on the surface (interfering with subsequent assay) have proven disadvantageous.

It is a particular disadvantage of cost-intensive and time-consuming methods such as PISA and NAPPA that the method cannot be monitored. Unusable arrays are constantly produced as a result, because the reaction has been stopped too early or the resulting "copy" fails to satisfy requirements.

In 2008, Taussig published the DAPA system (He et al., "Printing protein arrays from DNA arrays", Nature Methods, vol. 5, no. 2, pp. 175-177, February 2008), a method that permits any number of protein microarrays to be generated using a DNA microarray template. In this method, first the encoding DNA is spotted onto an epoxy-functionalized surface. A classic DNA microarray is thereby generated. Onto this DNA microarray, a thin membrane is placed, which is impregnated with the cell-free expression system. As soon as contact occurs and the microarray is wetted, the proteins are produced and diffuse undirected into the membrane. A surface onto which the proteins bind is therefore immediately placed on the back side of this "sandwich". As soon as a protein diffuses through the membrane, it binds to the surface and forms a protein microarray. After approximately 3 to 4 hours, the sandwich is opened and the DNA and the protein microarray are washed. Afterward, the protein microarray can be used for binding measurements, and the DNA microarray can be stored again until it is needed for producing the next protein microarray.

The obvious advantages of the DAPA system are that the resulting protein microarrays contain no contaminating DNA and the original DNA microarray can be reused at any time. The reusability of the DNA microarray represents a significant improvement over all previous methods. It is a disadvantage, however, that the placement of the impregnated membrane cannot be carried out in a clearly defined manner, and the membrane itself is a non-woven material, and therefore also an undefined material. Moreover, the physical contact between the membrane and the surfaces damages both the DNA and the protein microarray. This has a negative effect on the repetition accuracy of the method. Since it has heretofore been impossible to monitor the copying and/or derivatization process, it cannot be determined during the method whether a copy of sufficient quality will be produced. If such monitoring were possible, when a deteriorated DNA microarray was used the reaction time could be extended accordingly. It would also be possible to reliably determine when continued reuse of the same array would no longer provide satisfactory results. This would allow high costs and high time consumption to be minimized, since it would no longer be necessary to wait until the process is completed to ascertain that the template would no longer meet requirements.

The prior art in the field of producing microarray copies ([1]-[6]) contains no proposals or references that would suggest a combination with real-time detection methods. And no such solution has ever been proposed or suggested.

None of the described methods provide for real-time monitoring of the production of the copy or the derivative. The sole detection option that is known from the prior art is designed for monitoring whether the device is correctly filled and no air bubbles have developed, which would result in a "white spot" on the copy. This is achieved via a so-called detection window. However, no conclusion can be reached regarding the quality or the quantity of the copy/derivative being produced.

It is thus a disadvantage of the known methods that they are highly cumbersome and therefore time-consuming and costly. As a result, the failed production of an array that cannot be used due to an insufficient quantity or purity of protein or an insufficient quantity or purity of DNA or due to incorrectly adjusted process times and process temperatures is particularly undesirable. However, it is not currently possible to monitor and track the production of the array during the process.

The copying process therefore cannot be monitored, and no basis exists for determining how long the copying process should be carried out in order to obtain a copy/derivative of consistent quality.

The object of the invention is therefore to provide a method and a device that overcome the stated disadvantages.

DESCRIPTION

Figure 1:
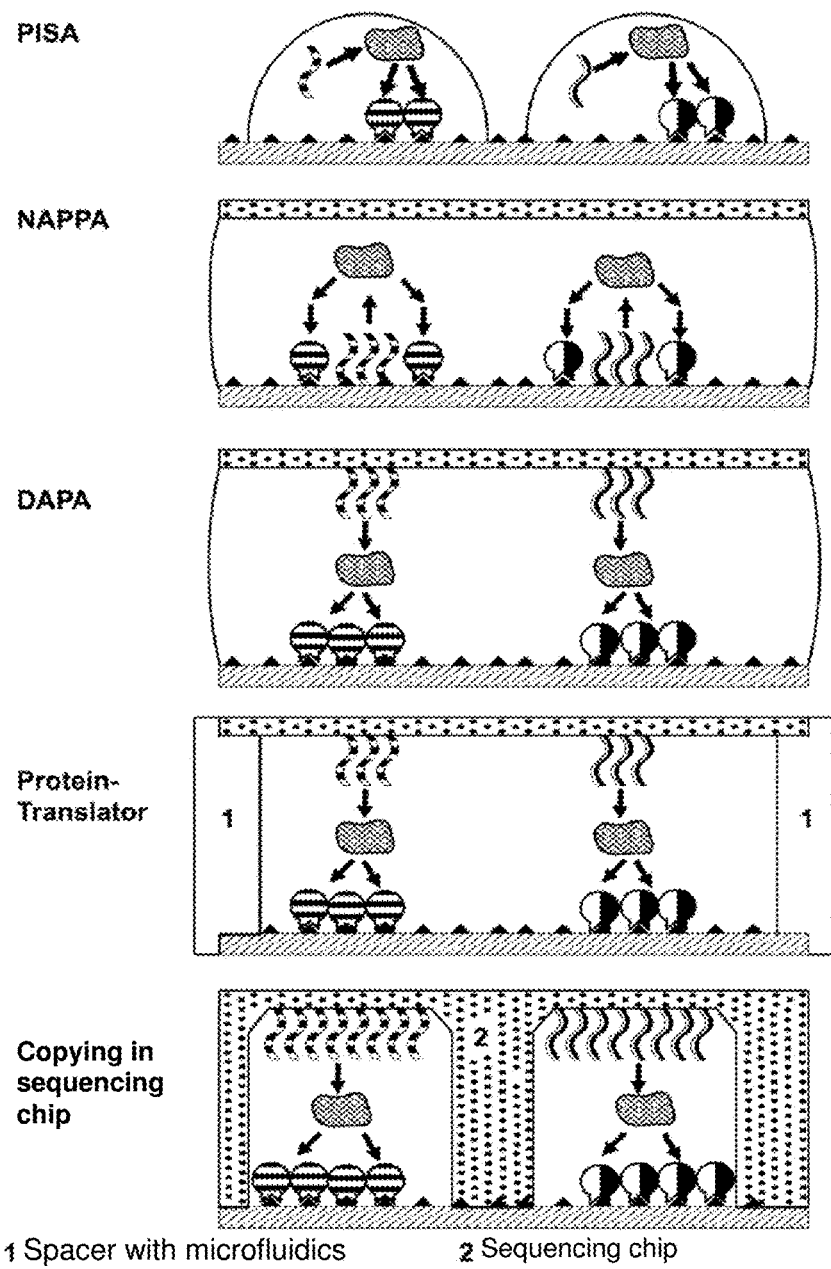
FIG. 1 shows the development of the microarray production technique in the case of DNA to protein.

The object is attained by the independent claims. Advantageous embodiments are specified in the dependent claims.

In a first embodiment, the invention relates to a method for producing a microarray, comprising the steps of
  a. providing a first original array that comprises a first support surface, to which at least one template molecule is bound,
  b. providing a second support surface (receiver surface) which is brought into a spatial orientation relative to the first support surface,
  c. providing a liquid, containing an enzymatic and/or chemical reaction system, between the first and second surfaces, so that regions of the two surfaces are in contact with one another via the liquid,
  d. producing a product molecule using the template molecule and the enzymatic and/or chemical reaction system,
  e. transferring the product molecule to the second support surface via the liquid between the first and second support surfaces, wherein a correlation exists between the binding site of the template molecule to the first support surface and the accumulation of the corresponding product molecule on the second support surface, f. wherein the accumulation of the product molecule on the receiver surface is detected in real time.

The second support surface therefore becomes a microarray as a result of the process. It was entirely unexpected in this method that the detection of product accumulation can be carried out during the production process, without impairment to the production process itself or to the quality of the product. Real-time detection allows better insight into the biochemistry and kinetics of the production of the product molecules. This better understanding allows better manufacturing protocols to be generated. At the same time, however, the invention also allows the production process to be stopped once the product has reached the desired contrast. This has not been possible in the prior art. In general, the invention allows the quality and contrast of the production process to be monitored for the first time. As a result, the method for producing microarrays can be made substantially more efficient and therefore ultimately more cost-effective. In addition, it can be ensured that the quality of the array that is produced on the second support surface remains consistent.

Contrast within the context of the invention refers specifically to the density of the molecules on the surface.

Product molecules within the context of the invention are particularly preferably amplificates and/or derivatives of the template molecule. Product is preferably the totality of the product molecules that are produced.

A copy within the context of the invention is a product molecule or the totality of the product molecules. Therefore, a copy is not only identical molecules, but any type of product molecule that can be produced by step d). A copy can therefore also be an amplificate or a derivative. Thus the copy of a DNA template molecule can be a DNA product molecule, for example, but also an RNA product molecule or a protein product molecule.

Real-time detection within the context of the invention means, in particular, that the production of the product molecules on the first support surface, the presence thereof in the interstice between the first and second support surfaces or the convergence or accumulation of the product molecules on the second support surface is detected while the process is still ongoing. Detection during or shortly after the accumulation on the second support surface is particularly preferred. Thus the product molecules can be detected during their production, before and/or during accumulation and/or shortly after accumulation. The step of performing a detection process after the production method is completed can thereby be avoided. It is therefore preferable for the structure to remain unchanged, and for no additional process steps to be introduced. The efficiency and speed of the method are thereby increased. The risk of contamination is also reduced, since fewer maneuvers are required. Processes that are running at an accelerated or decelerated rate can also be detected directly during production. This enables intervention into processes, so that an end product having a consistent or nearly consistent quantity of product molecules can be produced, for example, by stopping the process earlier if the reaction is running too rapidly, or later if the reaction is running too slowly.

Real-time detection allows the production process to be monitored directly. As a result, information regarding the production of the product (e.g. the copy or the derivative) can be collected. Such information relates, for example, to kinetics, temperature dependence, the comparison of various boundary conditions such as pH, salt content, etc. and various manufacturers. At the same time, the production process can be stopped at any time when the product has achieved the desired surface configuration (contrast). With reactions that run more slowly, therefore, the production time according to step d), that is, for example, the amplification time, can also be extended accordingly. Furthermore, measurements can be taken during the production process to determine whether all the spots of the resulting array have the same intensity, or whether individual spots are "lost".

With the invention, it is possible for the first time to copy a microarray and to detect the production of this copy in parallel. A significant difference from the prior art is that detection is carried out during production of the copy, instead of waiting until the production reaction has been completed. This is the only way to ensure that reaction step d) can still be influenced. Such influence preferably involves an adjustment in terms of time (termination or extension of the reaction) or thermal influence (heating or cooling the reaction chamber to accelerate or decelerate the reaction). However, such influence may also involve controlling other parameters, such as pH value or electric fields. Control through a combination of a plurality of parameters is also possible. For instance, the reaction can be terminated when a desired result is reached by cooling to below a critical temperature.

Within the context of the invention, the two surfaces are preferably arranged spatially opposite one another. It is further preferable for the method according to steps a) to e) to comprise a PISA, NAPPA or DAPA method.

The invention likewise relates to a method for the real-time detection of product molecule accumulation on a receiver surface, comprising the use of means for detecting and/or measuring the accumulation, wherein the accumulated product molecules are synthesized by an enzymatic step from an original microarray, preferably a nucleic acid microarray.

The method is further preferably characterized in that a gap, preferably a microfluidic gap, forms between the first and second support surfaces, which is filled with the liquid before, after or during the spatial orientation of the first and second support surfaces. One advantage of the gap is that the surfaces are exposed to less physical stress, thereby eliminating wear.

Steps a) to c) can therefore be carried out in any sequence. Providing the liquid once the two support surfaces have been placed in spatial separation from one another is advantageous because this allows steps a) and b) to be carried out before the reaction has started. The gap therefore functions as a physical barrier, preventing the two surfaces from coming into direct contact with one another. This barrier is overcome only when the liquid is added. The method can thereby be largely prepared before production of the copy is started. However, it can also be advantageous to place the liquid on one of the two support surfaces, and to then place the second support surface in position. Depending upon what type of device is chosen, this embodiment may be more suitable, since the liquid can be provided quickly and easily to the surface, and the entire surface can be easily reached. A person skilled in the art will be able to determine the proper sequence of steps a) to c) for the respective structure and use, without exercising inventive skill.

Another particular advantage of the invention is that, as a result of the method for producing a microarray according to the invention while simultaneously monitoring contrast, is that the selective control of the production process allows substantially better results to be achieved. Thus it is possible to use particularly long nucleic acid segments, for example, genomic DNA, as template molecules. This represents a tremendous advantage over the prior art. According to an article about microarrays by Monya Baker ("Microarrays, megasynthesis", Nature Methods, 2011, vol. 8, pp. 457), for example, researchers will always seek to use or study more and longer oligonucleotides with lower error rates, regardless of how libraries of oligonucleotides will be used, ("No matter how researchers intend to use libraries of oligonucleotides, they usually want more oligonucleotides, longer oligonucleotides and lower error rates."). This article also cites scientist Jay Shendure, who states that, with a possible length of 300 base pairs or even 1000 base pairs, multiple possibilities would open up which are not possible at this time ("If [the achievable length] was 300 base pairs or even a kilobase, there are a lot of things one could do that one can't do now."). It is precisely this problem that can be solved by the invention. For example, microarrays having DNA lengths of up to 1500 base pairs can be easily produced without a loss of quality. The invention therefore clearly contributes to solving a problem which the technical world had failed to solve satisfactorily as of the priority date. There was thus an urgent need to find a suitable solution to this problem.

It is further preferable for the first support surface to comprise reference spots that comprise reference molecules, preferably DNA reference molecules, wherein the reference molecules, like the template molecules, are converted in step d) to product molecules, and the production of these product molecules according to steps e) and f) is detected in real time, and wherein the process is terminated as soon as a predetermined reference size has been reached. Since in one preferred embodiment the kinetics and the masses of both the reference molecules and the product molecules of said reference molecules is known, calculations or estimates can be made with regard to the production thereof to determine how the production reaction of the product molecules in the present process will run in comparison with an ideal reference process. Based on the measured values that are obtained for the reference points, the reaction can then be adjusted accordingly, e.g. lengthened or shortened, in order to ideally produce identical quantities of product molecules from the reference spots. The use of reference values therefore facilitates the calculability and the manipulation of the control.

It is also possible, however, for the reference molecules to be proteins or any other possible type of template molecule. It is particularly preferable for the reference molecules to be template molecules that form product molecules in a known manner, and thus result in predictable structures on the second support surface.

Particularly preferable is the specified method in which the formation of the product molecules from the reference molecules are used for real-time monitoring and control of the transfer in order to enable real-time measurement over the course of the product molecule generation.

This embodiment is particularly well suited for quality control purposes. Reference spots are generated, e.g. from DNA. Through the reaction step, the DNA generates corresponding products in a highly specific manner. During the copying process, these products form spots on the surface of the second support surface, which are detected and/or measured by means of real-time measurement. As soon as these spots reach the predetermined reference size, the reaction step (e.g. the copying process) is terminated. The reaction step can be terminated, for example, by cooling. This ensures that a "copy" of consistent quality in terms of the reference spots will always be generated; this is independent of all other spots that are produced, particularly if no knowledge is available about the production kinetics of said spots. This method can preferably be used for template molecules such as DNA, RNA and protein. Using these reference spots or control spots allows different temperature dependencies of individual proteins to be compensated for, for example. Therefore, this embodiment enables further standardization of the method according to the invention.

It is further preferable for the support surfaces to be microstructured, and for the gap to be produced by this microstructure. However, it is also possible for a spacer to be placed between the first and second support surfaces in order to produce the gap.

It is further preferable for the first and/or the second support surface to have cavities. Such cavities allow the diffusion of the product molecules to be directed, resulting in a more precise spatial assignment between product molecule and template molecule.

This offers tremendous advantages, since the resulting array not only comprises the corresponding product molecules of the original array, but can also be assigned spatially thereto.

Particularly preferably, no membrane is located within this gap. Array production methods that contain a membrane are more susceptible to error, since the membrane is seen as a potential source of error. Moreover, eliminating a membrane allows a savings of both costs and time. Furthermore, with this embodiment, the quantity of reaction system that is required can be decreased. When a membrane is used, in most cases it is impregnated with the reaction system. However, a large amount of reaction system and the components contained therein is required for this purpose, resulting in high costs. This is circumvented by this embodiment.

Further preferred is the method that is characterized in that the template molecule is chosen from the group that comprises DNA, RNA, genomic DNA, cloned DNA fragments, plasmid DNA, cDNA, PCR products, synthesized DNA products, synthesized DNA oligonucleotides, mRNA and/or synthesized RNA. It is particularly preferable for the original array to be chosen from the group comprising DNA array and RNA array.

In a further preferred embodiment, the invention relates to the method, characterized in that, once the product molecules have accumulated, the second support surface is a microarray. Said microarray is preferably a DNA array, an RNA array, a protein array and/or an array of synthetic molecules.

For the method, it is irrelevant whether the product molecules are DNA, RNA, proteins, synthesized molecules or other molecules. This is particularly advantageous since such a structure can be used for producing an extremely wide range of arrays. Real-time detection is possible for all the resulting product molecules.

Within the context of the invention, copying means particularly the amplification of the template molecules and the derivatization thereof. In the present invention, an amplificate refers particularly to the totality of all images of an individual template molecule produced by an amplification reaction. It is preferably identical or is a clearly derivable derivative of the template molecule. The amplificate or sub-sections thereof can be derived from one or more sub-sections or from the totality of one or more sample fragments. The product molecule is particularly an amplificate and/or derivative, the molecular class of which may advantageously also be different from that of the original template molecule.

In initial experiments, DNA was chosen as the template molecule. A protein "copy" was then to be produced by the reaction steps. It was unexpectedly found that the product molecules (in this case, proteins) in the miniaturized system ran much more quickly than was expected. As compared with the DAPA system, in particular, a 3 to 10 times faster reaction time was achieved, and therefore, in the future, a protein copy can be completed after only approximately 15 minutes, rather than after approximately 90 minutes. Since this acceleration was entirely unforeseeable, and it was found that even small changes to the enzyme system produced significant changes in the time required to produce the copy, real-time detection of the accumulation of the molecules on the surface could be established as the solution to this effect, which could not be easily estimated.

With the DNA-to-DNA copy (template molecule is DNA and product molecule is DNA), a DNA microarray of previously unknown purity could be produced. This was based, among other things, on the enzymes that were used. The purity is so high that it cannot be estimated with a sequencing process, since such a process is more susceptible to errors than the copying process that was used. Therefore, at this time there are no measuring techniques that can fully detect the quality of the purity. The purity is higher than the measuring errors of more routine detection methods.

Furthermore, a DNA was advantageously sufficient for producing a copy of an entire volume unit.

The method according to the invention thus permits a more rapid, synthetically purer, less material-intensive and less labor-intensive production of microarrays, resulting in a dramatic cost savings, and also permits the production of microarrays which cannot be produced using prior art methods, or which could be produced only with a substantial expenditure of time, cost and labor, which is not efficient.

The method is further preferably characterized in that the real-time detection is a label-free method, preferably a label-free method which detects mass growth, the change in the refractive index, the change in optical, magnetic, electrical and/or electromagnetic properties.

Label-free or marking-free methods are particularly advantageous for use in the method of production according to the invention, because they are time-efficient and cost-effective, and at the same time, they are capable of detecting weak bonds. Label-free detection methods are particularly suitable, since they are highly sensitive and render the use of markers and/or labels, e.g. certain tags, dyes or other reagents, superfluous. The resources required for carrying out the method of production are thereby decreased. As a result, the production method is simplified, and potential sources of error are minimized by the elimination of the markers. By using label-free detection methods, it is possible to directly detect the accumulation of product molecules, without requiring previous modification of these molecules. This variant is further advantageous because the quality of the product array is not impaired by labels and markers.

Preferred label-free detection methods are imaging reflectometric interference spectroscopy (iRIfS) (see also [7]), BIND from SRU Biosystems, surface plasmon resonance (SPR) (see also [8]), Biacore detection, ellipsometry, measurement of turbidity and/or absorption or measurement using electrical elements. In addition, the following detection methods may also be implemented in a label-free manner. TIRF (total internal reflection fluorescence) is a label-free method if the product can be excited. Measurement using cyclovoltammetry can also be performed label-free if the product is directly accessible. Impedance measurement is a label-free detection method if the product alters the electrical properties of the surface. If the resulting product releases luminescence, luminescence measurement is also a label-free method. Fluorescence measurement is also label-free if the product is itself fluorescent.

In a further preferred embodiment, the invention relates to the method, characterized in that the real-time detection is a method that uses a label. In certain areas of application, the use of a detection method with a label can be expedient and advantageous. A person skilled in the art is capable of selecting the most suitable method for the respective method of production, without exercising inventive skill Preferred methods of detection that use label techniques include measurement using charge markers, measuring using quenched surface fluorescence, TIRF (in which a label is used to increase excitability), measurement using cyclovoltammetry, impedance measurement (when an incorporated label which amplifies electrical properties is used), luminescence measurement (when a coupled reaction takes place) or fluorescence measurement (by incorporating a fluorophore). Using a detection method with a label allows the sensitivity of detection to be increased and as a result, allows particularly precise results to be achieved.

The invention further relates to a method for producing a microarray, in which a direct detection method is used for real-time detection. A direct detection method within the context of the invention is preferably iRIfS, BIND, SPR, Biacore, ellipsometry or TRIF. A measurement of turbidity or an absorption measurement may be used as a preferred direct detection method if the product has a dye. Measurement with an electrical element can likewise be used as a direct detection method within the context of the invention if the molecule is charged. Measurement using charge markers is used as a direct detection method when the charge markers have been incorporated into the molecule and/or split off from said molecule. Measurement using cyclovoltammetry can be used as a direct detection method if the product is accessible. Impedance measurement can also be used for direct detection if the product itself can alter the electrical properties of the surface. Moreover, a measurement using trapped surface fluorescence can be used for direct proof when the product induces the change. The same applies to luminescence measurement when the product generates luminescence and for fluorescence measurement when the product is itself fluorescent. The advantage of using a direct detection method is that potential sources of error are excluded because the product is generated directly and not via additional auxiliary molecules.

However, it may also be preferable to conduct real-time detection via indirect detection. Preferred detection methods that indirectly detect the production of the product are iRIfS, BIND, SPR, Biacore, measurement of turbidity and absorption measurement. In all of these methods of indirect detection it is not the product itself but the production of a byproduct or a secondary reaction that is detected. Additional preferred indirect detection methods are measurements using an electrical element (if secondary products are charged or if a secondary reaction occurs), measurement using charge markers (if secondary products that contain the markers are produced), measurement by cyclovoltammetry (if a redox byproduct is produced), impedance measurement (if contained in a byproduct), TRIF (if incorporated into a byproduct), measurement using quenched surface fluorescence (if a byproduct induces the change), luminescence measurement (if a byproduct is used, e.g. pyrophosphate) or fluorescence measurement (if a byproduct is fluorescent). A person skilled in the art will know when he prefers indirect detection over direct detection for a specific method.

Particularly preferred are detection methods that are both performed directly and label-free.

Also preferred is the method that is characterized in that the real-time detection uses the receiver surface as a waveguide.

Also preferred is the method that is characterized in that the accumulation of the product molecule is detected by means of a method chosen from the group comprising physical methods, electrical methods, chemical methods, fluorescence measurements, luminescence measurements, spectroscopy, absorption measurements, polarization measurements, reflectometric interference spectroscopy, imaging reflectometric interference spectroscopy, surface plasmon resonance spectroscopy, biacore, ellipsometry, polarization anisotropy (see also [9]), turbidity measurement, pH measurement, measurement of available $H^+$ ions, measurement using excited surface fluorescence, internal total reflection fluorescence microscopy, measurement using quenched surface fluorescence, measurements using evanescent field excitation and/or measurement using Raman spectroscopy.

The label-free imaging reflectometric interference spectroscopy (iRIfS) detection method is particularly preferred here. In this case, a signal is generated by the interference of light on thin layers that have a different refractive index. As long as the refractive index of the glass that is used is different from that of water, it can be used for signal generation. Additional signal amplification is obtained when a highly refractive layer, e.g. titanium oxide, is introduced into the glass. This results in multiple-beam interference, which amplifies the signal.

If the template molecule is detected by means of iRIfS, a change in the surface mass as a result of binding of the product molecules can be detected. However, other surface interference techniques, e.g. BIND, can also be used. BIND is a label-free detection technique that allows a plurality of biomolecular interactions to be detected.

SPR (surface plasmon resonance) requires free electrons, which can be excited to surface plasmon resonances. Naturally, this means that the surface must bear a thin metal layer (in most cases copper, gold or silver) in order to permit these resonances. For reasons of stability and biocompatibility, gold is preferred. The label-free Biacore technique can preferably also be used for performing binding measurements. This technique has not been used in the past for an array copy. It was therefore entirely unexpected that this detection method would supply positive results. For this purpose it is preferable for the receiver surface to bear a gold layer, onto which the copied molecules are deposited and generate the copy. Detection is also carried out directly on the surface of the copy.

Product generation could also be successfully detected in real time using the optical detection method of ellipsometry. Using this method, layer thicknesses, and therefore the accumulation of molecules, can also be determined. In this case, an incident light beam is reflected on the surface. If molecules have accumulated on the surface, the reflective behavior will change, and in the case of circular or elliptical polarized light, will result in a shift in the polarization ratios. The change in the polarization direction corresponds to the mass accumulation. Measurement is likewise performed on the surface, and therefore provides direct information about the production of the products. This detection method is likewise label-free and therefore possesses the stated advantages. It was unexpected that a highly accurate determination of accumulation density could be achieved using this detection method. It is also particularly advantageous that no additional materials are required for this method.

Also preferred is real-time detection by measuring turbidity and/or absorption. This measurement is performed not on the surface, but in volumes above it. A light is beamed in, and from the backscattering and/or from the volume of light that passes through it is optionally determined how strongly the areas above the product scatter and/or absorb the light. A complexer which is formed from the running biochemical reaction can be used for this purpose, for example. Magnesium phosphate that forms is particularly suitable for this purpose [Mori et al (2001), "Detection of loop-mediated isothermal amplification reaction by turbidity derived from magnesium pyrophosphate formation", Biochemical and Biophysical Research Communications 289: 150-154]. When the reaction runs, the liquid becomes turbid above the spot and therefore becomes "less transparent". When transmitted light is measured, this spot will appear darker, and when backscattering is measured, the spot will appear brighter.

Measurement using electrical elements (see also [10]) has further proven advantageous. Similarly to detection in the ION torrent, the receiver surface can also contain printed electrodes, which measure the pH value and/or the availability of $H^+$ ions. When a production reaction takes place, the concentration of $H^+$ ions will change locally near the reaction. This is an indirect marker for the production of the copy, and was able to supply amazingly reliable results.

A direct detection of the copier reaction can be achieved using charge markers and cyclovoltammetry and/or impedance measurements, or the like. When molecules on the surface are lengthened and/or when binding takes place, these molecules will alter the electrochemical properties of the surface. This change can then be detected using corresponding so-called interdigital electrodes, and therefore allows a direct detection of the production reaction.

In the case of TIRF (total internal reflection fluorescence) a laser beam is coupled into the glass substrate in such a way that it is totally reflected. The evanescent field that is produced on the surface then excites only fluorophores, which sit very close to the surface. In the past, this method has been used only for detecting bonds on microarrays. It was therefore unexpected that the production of an array copy could also be detected with this reliable system. To make this detection technique usable for the invention, either fluorescent monomers are preferably added to the reaction mixture and are then incorporated into the product molecules (decreased incorporation efficiency), or an additional molecule is added at the level of the template molecules, which is likewise copied and then has fluorescent properties (competitive reaction for actual copying). When these biomolecules accumulate on the surface, they generate a fluorescence signal.

Real-time detection by means of measurement using quenched surface fluorescence can also be advantageous. This also involves a label-free fluorescence technique. For this purpose, a DNA strand is marked with a fluorophore. On this strand, a first molecule which is labeled with a DNA is then hybridized. By applying an alternating electric field, the DNA is drawn to the surface, and the fluorophore is eliminated by quenching. As a result of binding, the mass becomes larger, whereby the "drawing to the surface" is slowed by the alternating electric field. As a result, the increase in mass and therefore the binding can be detected.

This method also permits a direct detection of the production of the product.

It was also unexpected that measurement using luminescence and/or fluorescence would enable more reliable and accurate real-time detection within the context of the invention. Rather than measuring turbidity, a reaction byproduct can also be used to generate luminescence or fluorescence. Luminescence is already used, for example, with FLX 454 sequencing chips, and has become well known under the term "pyrosequencing". Correspondingly similar constructions can be produced for RNA or proteins. When a reaction takes place, the surrounding volume will begin to luminesce and/or will have fluorescence based on the quantity of molecules produced. This is an indirect indicator of how many molecules are able to bind to the copy.

Also preferred is the method that is characterized in that the enzymatic reaction system comprises enzymes chosen from the group comprising DNA polymerase, RNA polymerase and/or reverse transcriptase. The choice of the respective enzyme is based on the desired array that is to be produced by the method of production. A person skilled in the art will know which enzyme must be chosen for the production of the corresponding product molecules, without exercising inventive skill. For example, a DNA polymerase and/or a reverse transcriptase is preferably used if the product molecules will be DNA and a DNA microarray will be produced. In contrast, the use of RNA polymerase is preferred if an RNA microarray will be produced and the product molecules are RNA.

Further preferred is the method that is characterized in that the chemical reaction system comprises a cell-free mixture which generates corresponding proteins from DNA and/or RNA.

It is further preferable for the enzymatic reaction system to be a protein synthesizing system, so that, for example, enzymes are contained that transcribe the DNA to RNA and the RNA to protein. By selecting such a reaction system, a protein microarray can be produced with proteins as product molecules. The production of proteins as product molecules Also preferred is the method that is characterized in that the detection is used for monitoring the process for producing a molecular microarray. This embodiment is particularly preferred because it has not heretofore been possible to monitor the process of producing a microarray. It is the combination of the production process with real-time detection that allows monitoring to be performed during production of the array. This results in numerous advantages, since sources of error can now be identified in a timely manner and eliminated.

It is also preferable for the method to be characterized in that the original array is a planar array, preferably containing a sequencing chip of the DNA or RNA.

Methods are known from the prior art in which a detection window is provided, which can be used to monitor whether or not air bubbles form as the device is being filled. This detection window can preferably be used for the real-time detection of product production and therefore for contrast monitoring.

Also preferred is the method that is characterized in that, once the microarray has been produced, the detection method can additionally be used for binding measurement or interaction measurement. This method is particularly advantageous since using a detection system allows the production of the actual array to be detected, and allows subsequent analyses to be carried out, for which the same detection system is used. It was unexpected that, using the detection systems of the invention, subsequent testing can also be performed without using a new detection system. This allows the same structure to be maintained, thereby simplifying the process and the subsequent analyses. The risk of damage to the array is likewise reduced by the reduction in the amount of work required. Fewer process steps are also required, and not only can the detection unit be reused, the entire device that supplies the liquids for producing the microarray can then be used for supplying liquids to be tested, such as cell lysates, sample materials or system liquids. Thus the production device can also be used immediately following production as an analytical device.

In a further preferred embodiment, the invention relates to a microarray produced according to any of the described methods, wherein the production is monitored in real time.

In a further preferred embodiment, the invention relates to a device for the real-time detection of molecular accumulations on a receiver surface, comprising a device for producing a microarray by means of an enzymatic reaction and detection means, which can detect and/or measure the product molecule accumulations in real time, preferably by means of a stated detection method.

Such a device can ensure that the production of the product can be detected during the production process, and the production process can be adjusted (lengthened, shortened, etc.) if necessary.

The invention likewise relates to a method for producing and/or for copying a microarray, comprising preparing an original microarray, preferably a nucleic acid microarray, and a receiver surface, wherein product molecules are produced by an enzymatic reaction, and are deposited on the receiver surface as a corresponding microarray, characterized in that the molecular accumulation is detected and/or measured in real time.

The device and the method therefore allow the process parameters to be adjusted during the production process, thereby enabling the contrast and/or quality of the resulting product to be controlled. Based on the respective production speed of the product to be produced (preferably a copy and/or a derivative), the process time can be adjusted.

The present invention encompasses all options for real-time detection of a binding to a surface in combination with all options for array copying and/or array production.

In a further preferred embodiment, the invention relates to a kit for producing a microarray, wherein the production is detected in real time, comprising i. a first support surface,
j. at least one template molecule,
k. a receiver surface,
l. an enzymatic and/or chemical reaction system and
m. at least one detection means which can detect and/or measure the product molecule accumulations in real time, preferably by means of a detection method indicated above.

In this, it is particularly preferable for the template molecules to be bound to the first support surface.

It was entirely unexpected that a kit could be produced with which the method according to the invention could be implemented. Unexpectedly, the components of the kit can be stored over long periods of time without losing their functionality. The kit according to the invention can thus be stored for extended periods of time, thereby simplifying the implementation of the method according to the invention many times over.

Embodiment Example

In the interest of simplicity, all described applications are shown in the form of the protein translator (nucleic acid to protein). This does not constitute a restriction of the invention. All methods may be applied to all microarray copying techniques. With the suitable selection of geometry, parent molecules and amplification materials, application of the methods for DNA to DNA, DNA to RNA, RNA to protein, and RNA to DNA is also conceivable, and is not limited thereto.

FIG. 1 shows the development of the microarray production technique in the case of DNA to protein. With PISA, the DNA and the enzyme mixture were mixed and placed directly on the collector surface. This system produces the proteins directly during production of the array. With NAPPA, the DNA was already fixed onto the surface, and was later coated with the enzyme mixture. Thus a system is present which first produces the DNA arrays, and then produces the proteins later as needed. With DAPA, the DNA surface and the collector surface are separate. The DNA array is produced in advance and can then be copied many times over in a protein array. The protein translator is a system which allows liquids to be fed in selectively via a spacer and therefore allows the copier reaction and/or production reaction to start at any time. In addition, the geometry and the materials of the protein translator that are used permit direct detection of the binding of the proteins to the collector surface. In place of proteins, however, it is also possible to produce DNA, RNA or any other type of product molecule.

Figure 2:
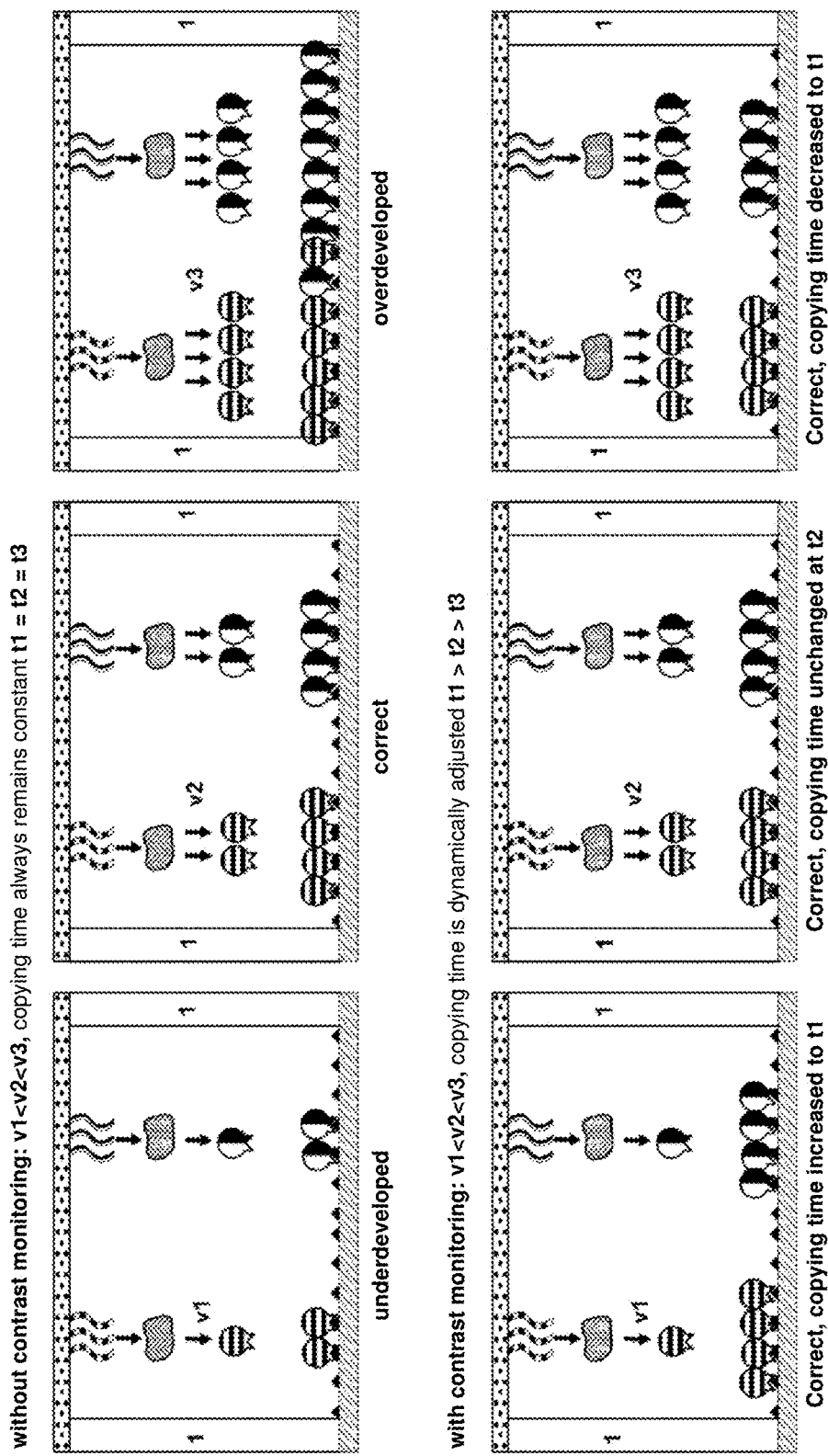
FIG. 2 shows a diagram of reactions running at different rates.

FIG. 2 shows a diagram of reactions running at different rates. Even a slightly adjusted pH value, salt content or temperature difference or a variance in the distance between the DNA array (original) and the receiver surface (product/copy/derivative) leads to biochemical reactions of different speeds, and therefore to different rates of production of the product molecules. These then likewise diffuse at different rates, resulting in a production of the product at different speeds. Therefore with rapid reactions, the product is overdeveloped, and with slow reactions it is underdeveloped accordingly. A direct adjustment of the production time based on the real-time detection according to the invention allows products (copies/derivatives) of consistent quality to be produced.

Figure 3:
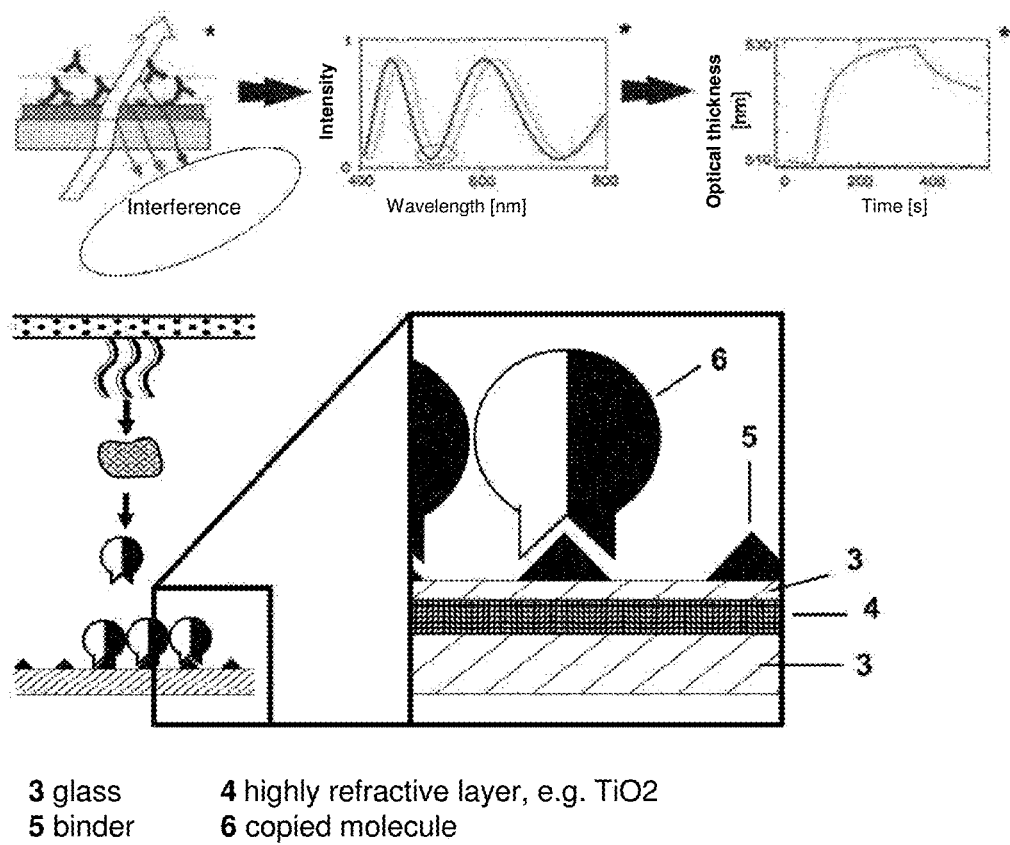
FIG. 3 shows a diagram of the signal generation of a modified RIfS technique.

FIG. 3 shows a diagram of the signal generation of the RIfS technique (modified according to: http://barolo.ipc.uni-tuebingen.de/research/bilder/rifs-prin-antialising-%20englisch.jpg). This is the detection method preferably used for the method according to the invention. Incident light produces interference on the surface. This can be amplified using a "buried" highly refractive layer, such as titanium oxide. This imaging method allows a video of product production or of a binding to be generated directly. This technique requires a planar surface.

Figure 4:
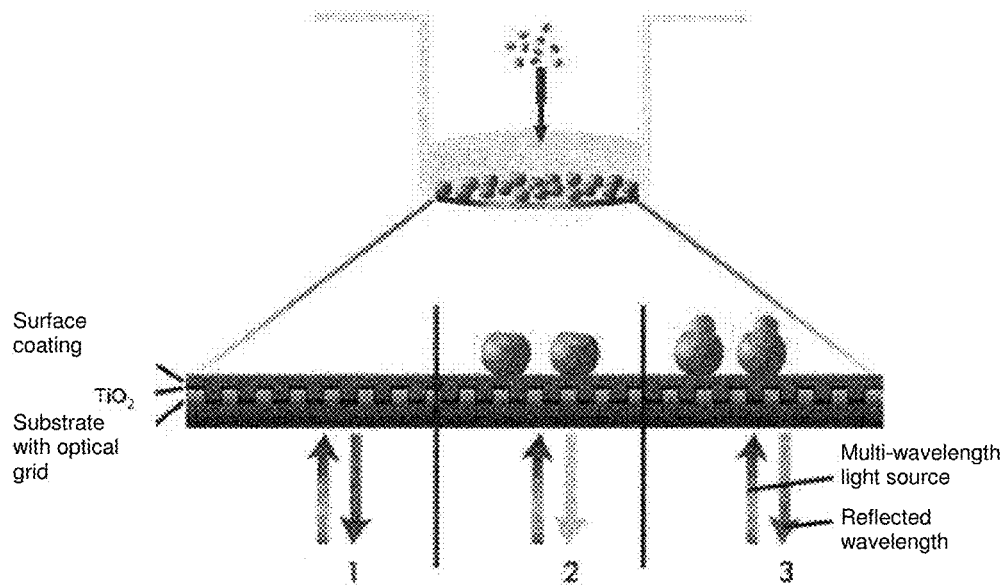
FIG. 4 shows a diagram of the signal generation in a modified BIND technique.
Figure 4:
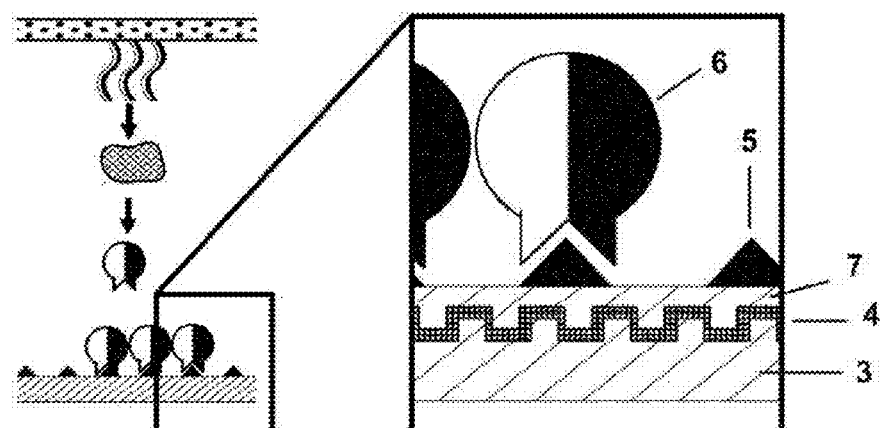

FIG. 4 shows a diagram of the signal generation in the BIND technique (modified according to: http://www.srubiosystems.com/Technology/index.html). Incident white light generates interferences on the structured highly refractive layer, which interact with the surface. Different interferences result in different tints, which can in turn be attributed to the surface density of the molecules. This technique requires a buried grid structure of a highly refractive layer.

Figure 5:
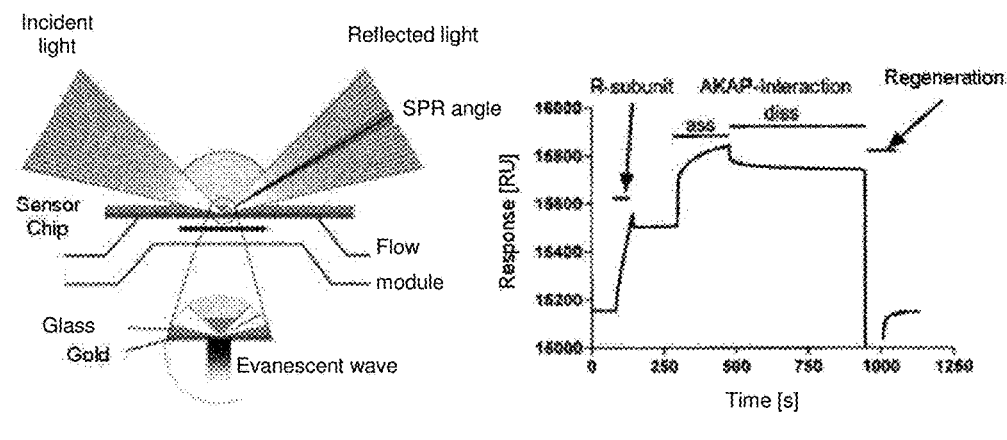
FIG. 5 shows a diagram of the signal generation of a further modified Biacore technique.
Figure 5:
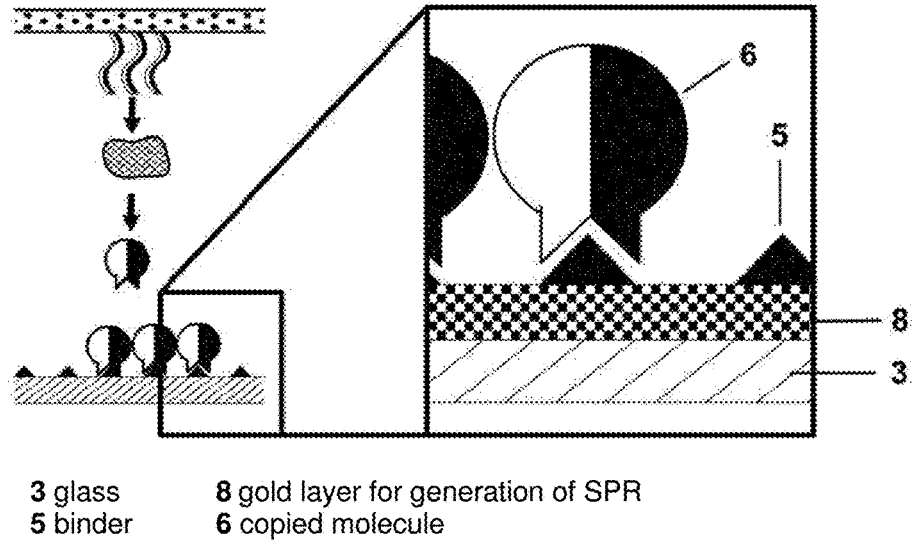

FIG. 5 shows a diagram of the signal generation of the Biacore technique (modified according to http://ars.els-cdn.com/content/image/1-s2.0-S0165993610002487-grl.jpg and http://ars.els-cdn.com/content/image/1-s2.0-S0022283600936623-gr2.gif). Incident light at a predefined angle interacts on the surface with the plasmons and is then emitted at a slightly adjusted angle (SPR angle). Binding molecules to the surface causes the plasmons to be "tuned" and the angle to be adjusted. This results in real-time detection. This technique requires a gold coating.

Figure 6:
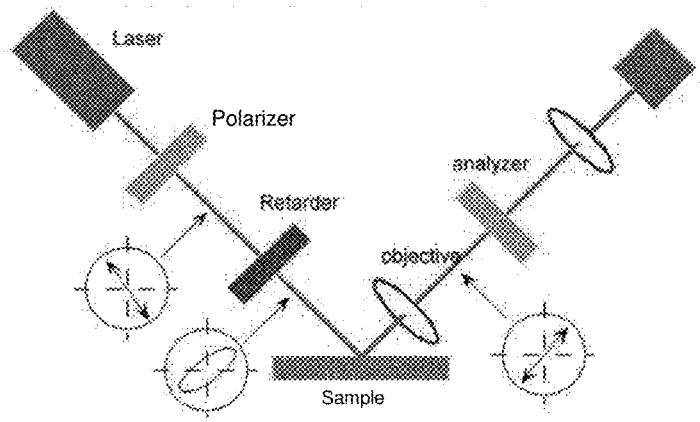
FIG. 6 shows a diagram of the signal generation of a modified ellipsometry.
Figure 6:
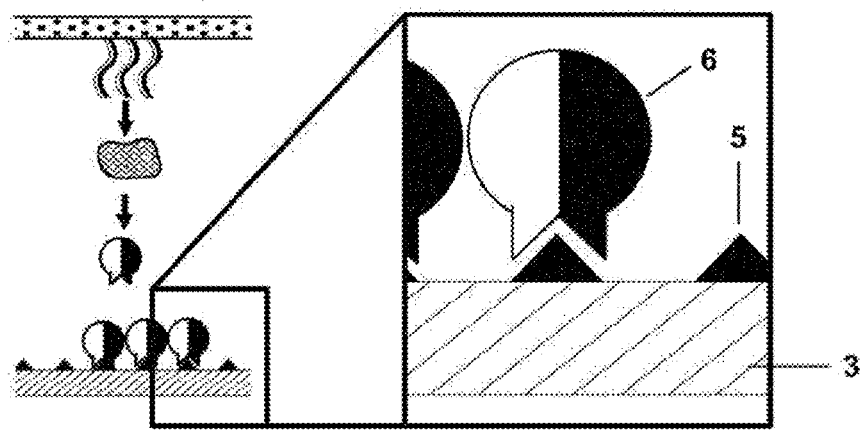

FIG. 6: Diagram of the signal generation of ellipsometry (modified according to http://www.optrel.de/pdfs/flyer/imaging-elli.pdf on 20 May 2012). Polarized light is beamed onto a surface. The backscattered portion of the light is dependent on the polarization direction, i.e. the longitudinally and transverse polarized light fractions are reflected differently, resulting in a rotation of the main polarization axis. This surface requires no surface modifications, however it is slow and not as sensitive as the preceding techniques.

Figure 7:
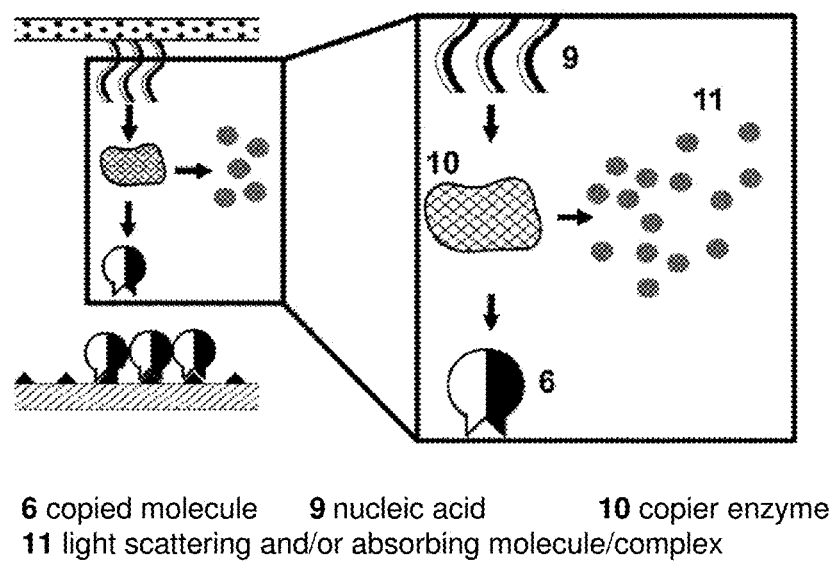
FIG. 7 shows a diagram of the signal generation of turbidity measurement.

FIG. 7 shows a diagram of the signal generation of turbidity measurement. It is advantageous that a commercially available microscope can be used for this purpose. Light is beamed in. When a reaction takes place, the medium becomes turbid above the spots that are produced. The intensity of the turbidity is a measurement of the quantity of molecules produced. This is an indirect measurement of the quantity of molecules accumulated on the surface. This technique does not require any surface modifications, and instead requires only a signal-generating molecule in the reaction mixture.

Figure 8:
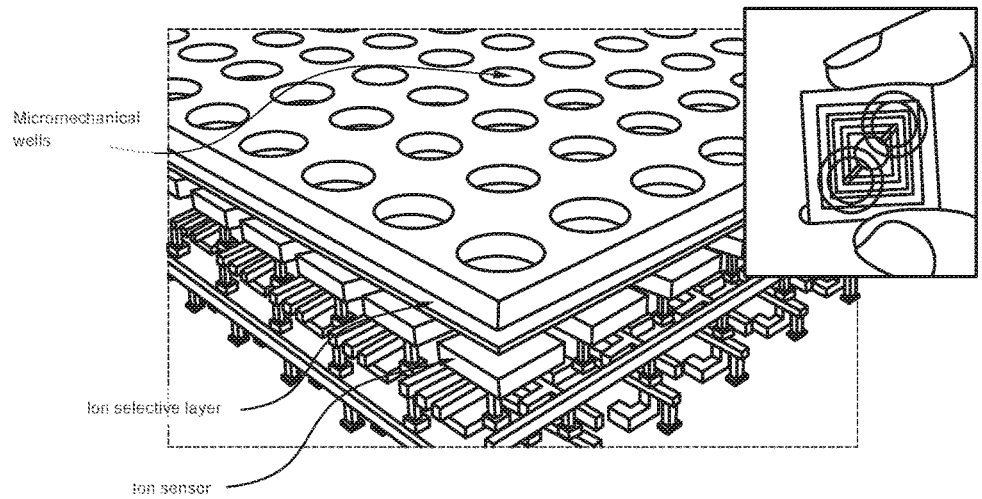
FIG. 8 shows a diagram of the signal generation of a modified ion measurement.
Figure 8:
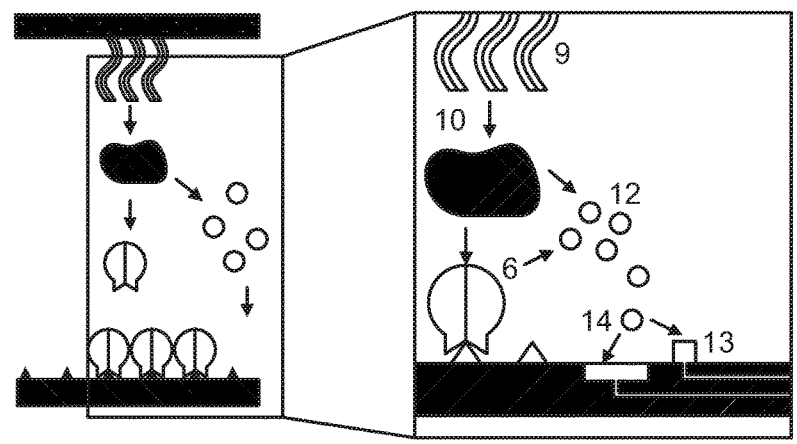

FIG. 8 shows a diagram of the signal generation of ion measurement (modified according to: http://de-de.invitrogen.com/etc/medialib/images/Sequencing/Semiconductor-Sequencing/Ion-Torrent.Par.79124.Image.660.400.1.Step-2.gif and http://www.technologyreview.com/files/49534/sequencing_x220jpg). A quantitative detection of a biochemical reaction has already been achieved in the ion torrent by means of ion detection. By embedding corresponding electrodes in the copier substrate, this likewise becomes a detection alternative. However producing the electrodes is cost-intensive.

Figure 9:
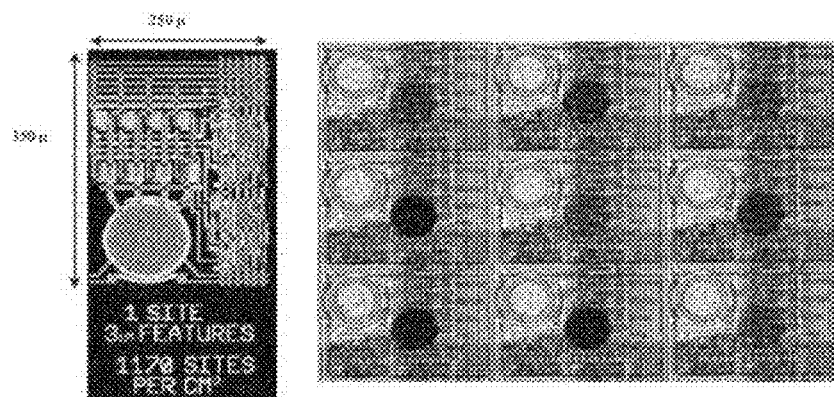
FIG. 9 shows a diagram of the signal generation of a modified ion measurement on the surface.
Figure 9:
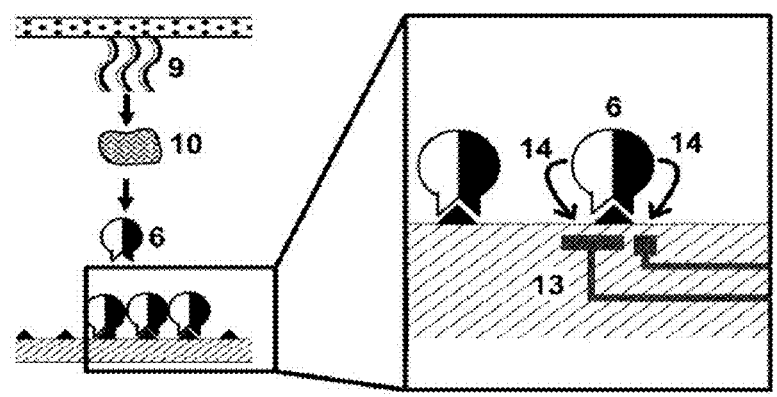

FIG. 9 shows a diagram of the signal generation of ion measurement on the surface (modified according to http://ars.els-cdn.com/content/image/1-s2.0-S09566566304002544-grl.jpg). In this case, interdigital electrodes are used for selectively generating DNA and proteins, and later for binding measurement. An identical system can likewise be used for measuring the accumulation of molecules on the receiver surface. Corresponding electrodes must be introduced into the receiver surface for this purpose.

Figure 10:
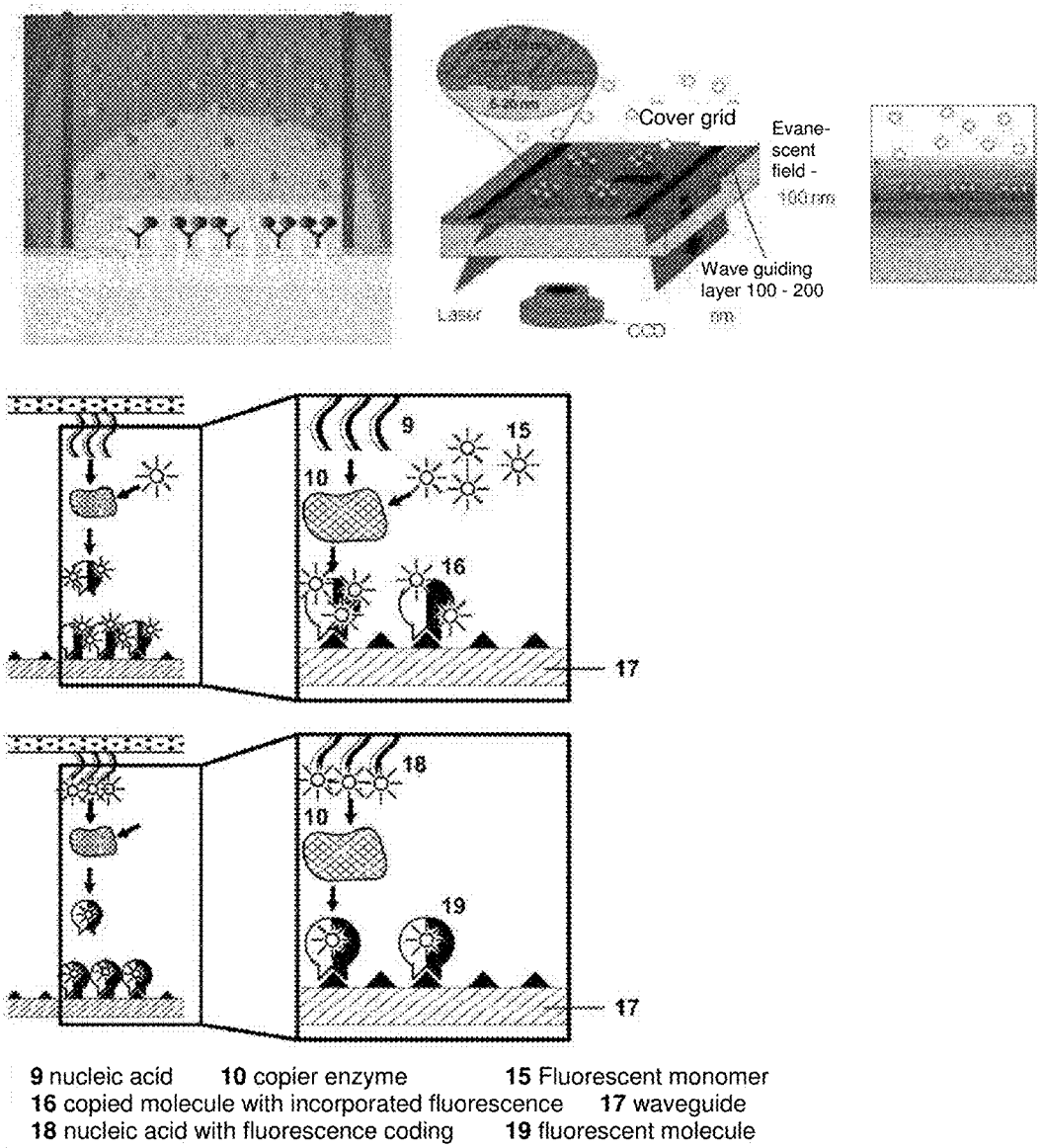
FIG. 10 shows a diagram of the signal generation of a modified fluorescence on the surface.

FIG. 10 shows a diagram of the signal generation of fluorescence on the surface (modified according to http://www.zeptosens.com/en/pdf/planar_wave_guide.pdf and http://www.1bb.ethz.ch/Equipment/zeptoreader/ZeptoREADER_Principlejpg?hires). In this case, the receiver surface is used as a waveguide, which uses an evanescent field to excite only fluorophores that are near the surface, and therefore bound. In this case, fluorescence can be produced by means of incorporated fluorescent monomers or by means of the fluorescence of the produced molecules.

Figure 11:
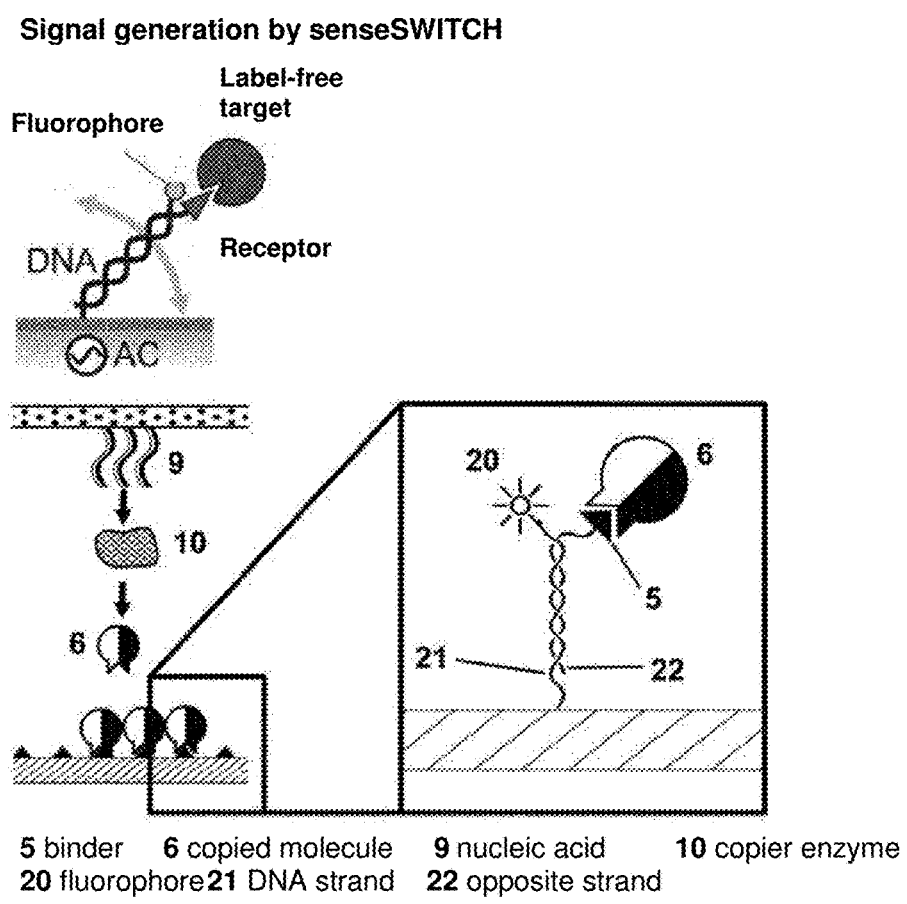
FIG. 11 shows a diagram of signal generation by a modified fluorescence quenching on the surface.

FIG. 11 shows a diagram of signal generation by fluorescence quenching on the surface (modified according to: http://dynamic-biosensors.com/index.php/bio-sensor-technology/switchsense-technology-alias.html). Movement is induced by means of AC voltage. The average distance from the surface is a measure of the mass of the molecule. It can therefore be determined based on a decrease and/or an increase in fluorescence whether binding has taken place. For this purpose, the receiver surface is coated with DNA or a movable long molecule.

Figure 12:
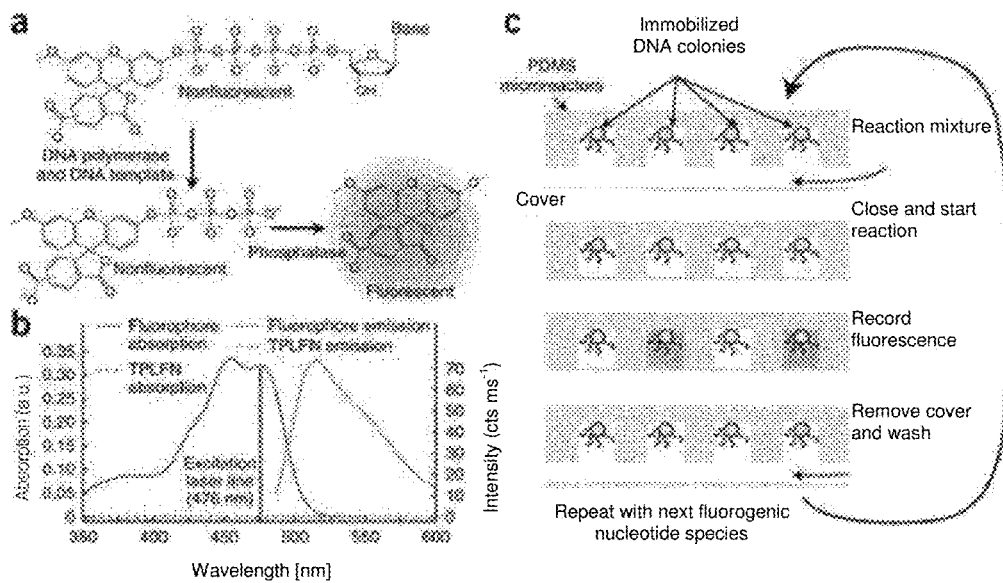
FIG. 12 shows a diagram of signal generation by a modified fluorescence or luminescence in solution.
Figure 12:
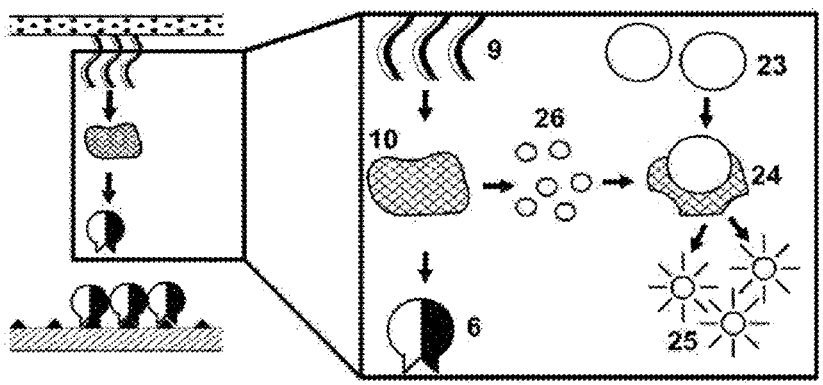

FIG. 12 shows a diagram of signal generation by fluorescence or luminescence in solution (modified according to: http://www.nature.com/nmeth/journal/v8/n7/images_article/nmeth.1629-F1.jpg). By coupling biochemical reactions to resulting byproducts such as pyrophosphates, luminescence or fluorescence can be produced. For this purpose, both a corresponding additional enzyme system and substrates were admixed to the reaction mixture.

Figure 13:
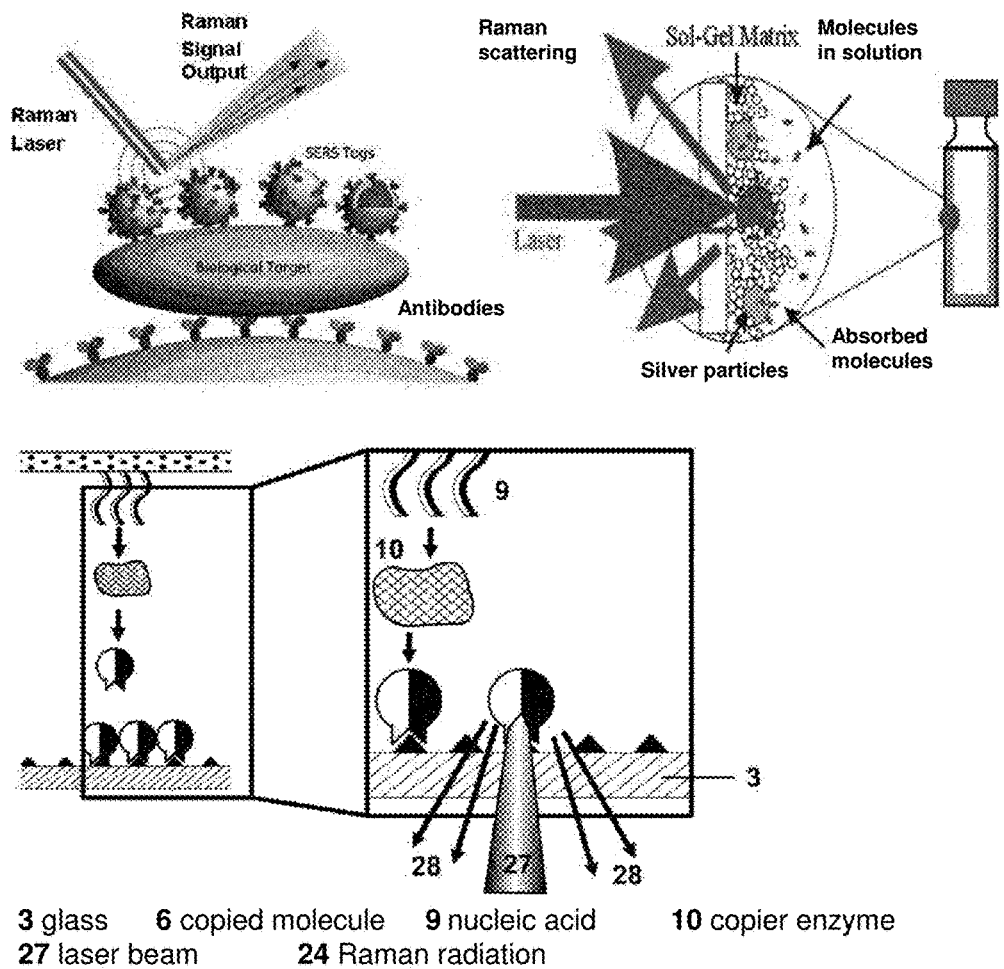
FIG. 13 shows a diagram of signal generation by a modified surface amplified Raman spectroscopy.

FIG. 13 shows a diagram of signal generation by surface amplified Raman spectroscopy (modified according to http://spie.org/Images/Graphics.Newsroom/Imported-2011/003645/003645_10_fig2.jpg and http://sbir.gsfc.nasa.gov/SBIR/successes/images/9-028pic.jpg). Raman spectra can be induced by laser radiation. This effect can be amplified on surfaces. It is preferable in this process for metallic nanoparticles to be applied to the surface. For this embodiment, a sensitive detector is also used for analyzing the Raman radiation and requires corresponding optics.

Figure 14:
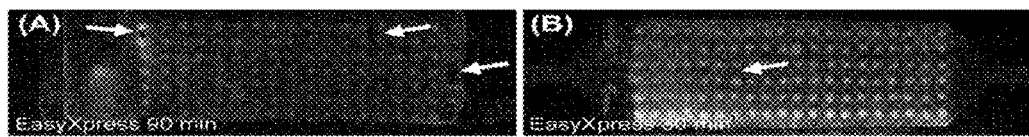
FIG. 14 shows the detection of a "protein copy"

FIG. 14 shows the detection of a "protein copy". It could be demonstrated that a protein copy of a DNA array can be produced by means of a device according to the invention, while at the same time, the production of this product could be detected in real time. As the end point, the proteins were dyed with specific fluorescent labeled antibodies. For purposes of comparison, a DAPA (A) and a protein copy in the hand-held device (B) were implemented in coordination. In all cases, a protein copy could be produced. However, it was found that a copy is faster in the hand-held device than in the DAPA. Moreover, copy (B) is overdeveloped. It is for precisely this reason that real-time detection is necessary. The white and red arrows indicate errors in the copies (DAPA (A): white=scratches, red=smears by membrane fibers, hand-held device (B), white=air bubbles and therefore no copy, red=slight fluid drift and therefore streaks).

Figure 15:
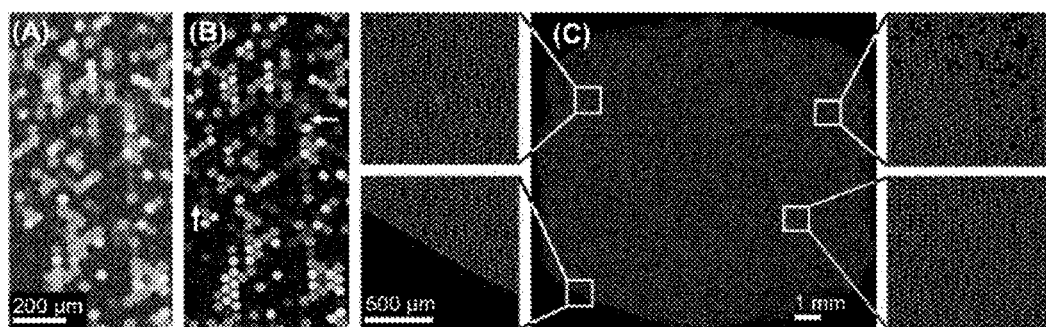
FIG. 15 shows the detection of a DNA copy.

FIG. 15 shows the detection of a DNA copy. In this case, DNA has been copied from a sequencing chip (A) onto a surface (B). The copy and the sequencing chip were then dyed with specific hybridization probes. Two green pixels (white arrows in B) could not be copied. The sequencing chip appears blurry due to its 3D structure. The DNA copier reaction (C) could be run over a large area having approximately 110,000 cavities.

Figure 16:
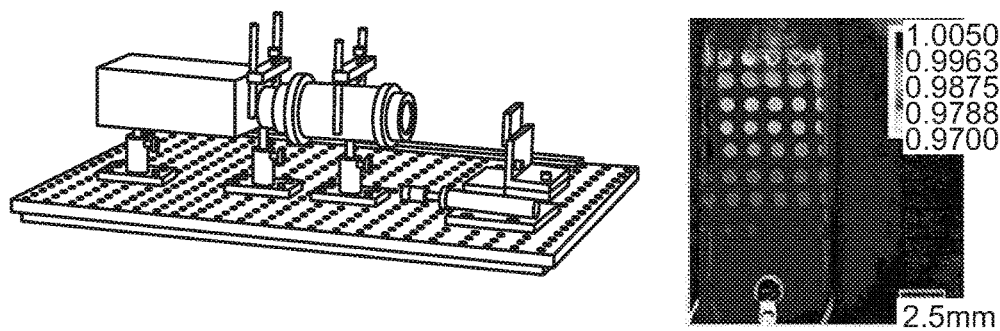
FIG. 16 shows the detection of label-free measurement by means of iRIfS.
Figure 16:
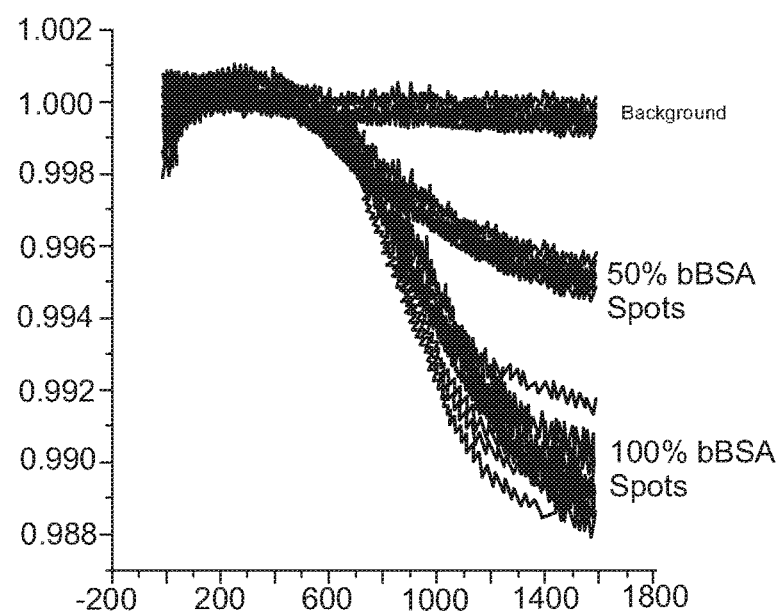

FIG. 16 shows the detection of label-free measurement by means of iRIfS. In the flow chambers used, binding measurements (center of figure) and molecular accumulations could be detected through imaging. A real-time detection (right side of figure) of nearly 100 different points was also possible.

REFERENCES

[1] M. He, O. Stoevesandt, E. A. Palmer, F. Khan, O. Ericsson, and M. J. Taussig, "Printing protein arrays from DNA arrays," Nature Methods, vol. 5, no. 2, pp. 175-177, February. 2008.

[2] U. Chandra and S. Srivastava, "Cell-free synthesis-based protein microarrays and their applications," Proteomics, vol. 10, no. 4, pp. 717-730, February. 2010.

[3] M. Y. He and M. J. Taussig, "Single step generation of protein arrays from DNA by cell-free expression and in situ immobilisation (PISA method).," Nucleic Acids Research, vol. 29, no. 15, p. art-e73, August. 2001.

[4] J. Scbel, K. Bartschercr, A. Jacob, J. D. Hoheisel, and P. Angenendt, "Microarray technology as a universal tool for high-throughput analysis of biological systems," Combinatorial Chemistry & High Throughput Screening, vol. 9, no. 5, pp. 365-380, June2006.

[5] N. Ramachandran, E. Hainsworth, B. Bhullar, S. Eisenstein, B. Rosen, A. Y. Lau, J. C. Waiter, and J. LaBaer, "Self-assembling protein microarrays," Science, vol. 305, no. 5680, pp. 86-90, July2004.

[6] N. Ramachandran, S. Srivastava, and J. LaBaer,"Applications of protein microarrays for biomarker discovery," Proteomics Clinical Applications, vol. 2, no. 10-11, pp. 1444-1459, October. 2008

[7] http://barolo.ipc.uni-tuebingen.de/markierungsfrei.php?lang=en&show=10

[8] http://www.biacore.com/lifesciences/technology/introduction/Flow_cells/index.html

[9] http://www.optrel.de/pdfs/flyer/imaging-elli.pdf

[10] http://www.youtube.com/embed/yVf2295JqUg

[11] A. Kumar, Z. Liang, Chemical nanoprinting—a novel method for fabricating DNA microchips, Nucleic Acids Res, vol. 29, pp, e2, 2001

[12] Q. Du, O. Larsson, H. Swerdlow, Z. Liang, DNA immobilization: Silanized nucleic acids and nanoprinting, 2005, pp. 45-61

[13] A. A. Yu, G. S. Taylor, A. Guiseppe-Elie, H. I. Smith, F. Stellacci, Supramolecular nanostamping: Using DNA as movable type, Nano Letters, vol. 5, pp. 1061-1064, 2005

[14] S. Kim, G. Lim, S. E. Lee, J. Lee, K. Yun, J. Park, DNA chip replication for a personalized DNA chip, Biomolecular Engineering, vol. 23, pp, 129-134, 2006

[15] J. Kim, R. M. Crooks, Transfer of surface polymerase reaction products to a secondary platform with conservation of spatial registration, J. Amer. Chem. Soc., vol. 128, pp. 12076-12077, 2006

The invention claimed is:

1. A method for producing a microarray, comprising
a) providing a first original array comprising a first support surface comprising reference spots that comprise reference molecules, to which at least one template molecule is bound,
b) providing a second support surface (receiver surface), which is brought into a spatial orientation relative to the first support surface,
c) providing a liquid, containing an enzymatic and/or chemical reaction system, between the first and second support surfaces, so that regions of the two surfaces are in contact with one another via the liquid,
d) producing product molecules using the template molecule and the enzymatic and/or chemical reaction system from said reference molecules,
e) transferring the product molecules to the second support surface via the liquid between the first and second support surfaces, wherein a correlation exists between a binding site of the template molecule to the first support surface and an accumulation of the corresponding product molecules on the second support surface, and
f) detecting the accumulation of the product molecules on the receiver surface in real time,
wherein a production of the product molecules according to steps e) and f) is detected in real time, and the producing of d), the transferring of e) and the detecting of f) are terminated as soon as a predefined reference spot size has been reached.

2. The method according to claim 1, wherein
a gap exists between the first and second support surface, which is filled with the liquid before, after or during the spatial orientation of the first and second support surfaces.

3. The method according to claim 1, wherein the detecting in real time involves a label-free method, that detects the mass growth, the change in the refractive index, or the change in optical, magnetic, electric and/or electromagnetic properties.

4. The method according to claim 1, wherein the detecting in real-time involves a method that uses a label.

5. The method according to claim 1, wherein in the detecting in real-time the receiver surface serves as a waveguide.

6. The method according to claim 1, wherein said detecting comprises
a method selected from a group consisting of physical methods, electrical methods, chemical methods, fluorescence measurements, luminescence measurements, spectroscopy, absorption measurements, polarization measurements, reflectometric interference spectroscopy, imaging reflectometric interference spectroscopy, surface plasmon resonance spectroscopy, biacore, ellipsometry, polarization anisotropy, turbidity measurement, pH measurement, measurement of available H+ions, measurement with excited surface fluorescence, internal total reflection fluorescence microscopy, measurement using quenched surface fluorescence, measurements using evanescent field excitation, measurement using Raman spectroscopy and combinations thereof.

7. The method according to claim 1, wherein the microarray that is produced is a DNA array, an RNA array, a protein array and/or an array of synthetic molecules.

8. The method according to claim 1, wherein the template molecule is selected from a group consisting of DNA, RNA, genomic DNA, cloned DNA fragments, plasmid DNA, cDNA, PCR products, synthesized DNA products, synthesized DNA oligonucleotides, mRNA, synthesized RNA and combinations thereof.

9. The method according to claim 1, wherein the original array is a DNA array and or a RNA array.

10. The method according to claim 1, wherein the enzymatic reaction system according to c) comprises DNA polymerase, RNA polymerase and/or reverse transcriptase.

11. The method according to claim 1, wherein the chemical reaction system comprises a cell-free mixture, which produces from DNA and/or RNA corresponding proteins.

12. The method according to claim 1, wherein the detecting is used for monitoring a production process of the microarray.

13. The method according to claim 1, wherein the original array is a planar array that contains DNA or RNA.

14. The method according to claim 1, wherein following production of the microarray, a binding or interaction is also measured in f).

15. The method according to claim 13, wherein the planar array is a sequencing chip.

* * * * *